United States Patent [19]
Auerbach

[11] 3,917,700
[45] Nov. 4, 1975

[54] NITRONE COMPOUNDS
[75] Inventor: Melvin Auerbach, Akron, Ohio
[73] Assignee: The Goodyear Tire & Rubber Company, Akron, Ohio
[22] Filed: Jan. 30, 1974
[21] Appl. No.: 438,078

[52] U.S. Cl...... 260/566 R; 260/45.9 R; 260/290 R; 260/465 F; 260/471 A; 260/521 R; 260/645; 260/647
[51] Int. Cl.²........................................ C07C 119/00
[58] Field of Search.............. 260/645, 570.9, 566 R

[56] References Cited
UNITED STATES PATENTS
3,225,099   12/1962   Coffield ........................... 260/570.9

OTHER PUBLICATIONS
Pacifici et al., "Journal American Chemical Society," Vol. 92, No. 17, pp. 5231–5233 (1970).

*Primary Examiner*—R. V. Hines
*Attorney, Agent, or Firm*—F. W. Brunner; R. A. Thompson; J. Y. Clowney

[57] ABSTRACT

Compositions of matter corresponding to the general formula

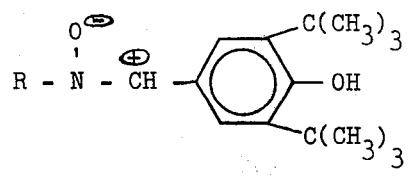

wherein R is selected from a group consisting of alkyl radicals, cycloalkyl radicals, phenyl radicals and substituted phenyl radicals.

1 Claim, No Drawings

NITRONE COMPOUNDS

This invention relates to new compositions of matter. More particularly, this invention relates to new 1,3-dipolar compounds.

The present invention relates to new compositions of matter corresponding to the general formula:

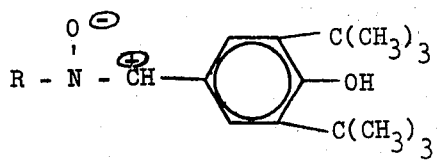

wherein R is selected from a goup consisting of (1) alkyl radicals containing from 1 to 12 carbon atoms, (2) cycloalkyl radicals, (3) condensed ring aromatic hydrocarbon radicals, (4) phenyl radical and (5) substituted phenyl radical containing at least one substituent selected from the group consisting of chlorine, bromine, iodine and fluorine atoms and alkyl, alkoxy, nitro, tertiary amino, cyano, carboxy and carboalkoxy radicals.

The 1,3-dipolar compounds of the present invention are prepared by the reaction of a nitroso compound corresponding to the formula RNO where R is selected from the group consisting of (1) alkyl radicals containing from 1 to 12 carbon atoms, (2) cycloalkyl radicals, (3) condensed ring aromatic hydrocarbon radicals, (4) phenyl radical, and (5) substituted phenyl radical containing at least one substituent selected from the group consisting of chlorine, bromine, iodine and fluorine atoms and alkyl, alkoxy, nitro, tertiary amino, cyano, carboxy and carboalkoxy radicals with 3,5-di-t-butyl-4-hydroxy benzyl pyridinium chloride. This reaction may be illustrated by the following general equation:

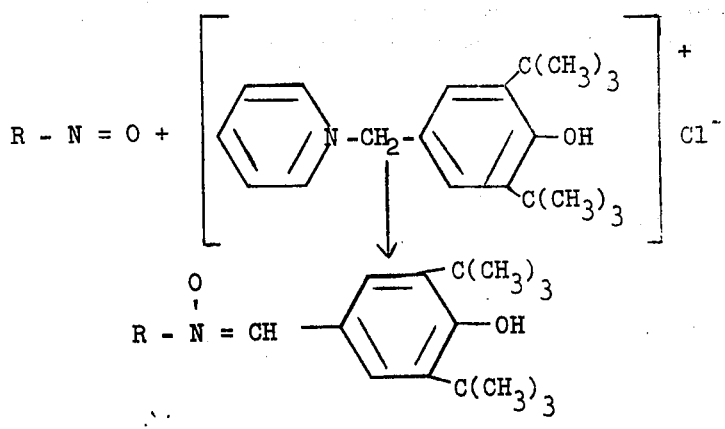

In general, the preparation of the 1,3-dipolar compounds of this invention is carried out in any suitable inert organic solvent. By the term "inert" is meant that the solvent neither enters into the structure of nor interferes with the preparation of the product. Suitable inert organic solvents include alcohols such as methanol, ethanol, isopropanol and the like, ethers such as dioxane, tetrahydrofuran and the like, and ketones and nitriles such as acetone, acetonitril and the like. Mixtures of the above solvents can also be employed with satisfactory results. The amount of solvent employed may range from about 2 to about 20 times the weight of the reactants present.

the time required to produce the 1,3-dipolar compounds of this invention is not critical. Good results are achieved over a wide range of reaction times. Generally, the time required to produce good yields of product can range from about 1 to about 24 hours. Best results are achieved over a range of from about 2 to about 6 hours.

The temperature employed in the preparation of the compounds of this invention are somewhat critical. If the temperature used in the preparation of the 1,3-dipolar compounds is too high, then the compound will decompose to render the yield at a lower level. The reaction temperature to form the 1,3-dipolar compound should be from about 0°C. to about 25°C. The more preferred reaction temperature is from about 0°C. to about 5°C.

Representative of the types of nitroso compounds that can be utilized in the preparation of the 1,3-dipolar compounds of the present invention include nitroso benzene, p-nitrosonaphthalene, nitrosotoluene, 3,5-di-t-butyl-4-hydroxy-nitroso-benzene, and the like.

The reactants employed to produce the compounds of the present invention are usually employed on a mole-to-mole basis. Thus, for every mole of the 3,5-di-t-butyl-4-hydroxybenzyl pyridinium chloride employed there is employed an equivalent number of moles of the nitroso compound reactant. However, it has also been found that in some instances it is preferable to employ an excess of the nitroso compound. The advantages of employing an excess of the nitroso compound include increased yields and faster reaction rates.

The 1,3-dipolar compounds can be recovered from the reaction mixture by such methods as filtration followed by precipitation of the filtrate by the addition of water or by evaporation of the reaction solvent. The former procedure of the addition of water is preferred for the reason that purer initial products are obtained.

The products thus obtained may be further purified by recrystallization from such representative solvent mixtures as ethanol/water or ether/pentane.

The 1,3-dipolar compounds prepared by the description herein are antioxidants which are capable of being built into the rubber and function as antioxidants to protect the rubber against oxidative attack. The compounds could therefore be called antioxidant compounds.

Representative examples of the 1,3-dipolar compounds of the present invention include:

1-(3,5-di-t-butyl-4-hydroxyphenyl)-N-naphthyl nitrone,
1-(3,5-di-t-butyl-4-hydroxyphenyl)-N-phenyl nitrone,
1-(3,5-di-t-butyl-4-hydroxyphenyl)-N-butyl nitrone,
1-(3,5-di-t-butyl-4-hydroxyphenyl)-N-(2-bromobutyl) nitrone,
1-(3,5-t-butyl-4-hydroxyphenyl)-N-cyclohexyl nitrone,
1-(3,5-di-t-butyl-4-hydroxyphenyl)-N-(4-nitrophenyl) nitrone,
1(3,5-di-t-butyl-4-hydroxyphenyl)-N-(3-ethyl phenyl) nitrone,
1-(3,5-di-butyl-4-hydroxyphenyl)-N-tolyl nitrone,
1-(3,5-di-t-butyl-4-hydroxyphenyl)-N-(2-ethoxy phenyl) nitrone.

It has been discovered that the 1,3-dipolar compounds of this invention, which contain an antioxidant functional group, can be reacted with a wide variety of oxidizable, sulfur-curable rubbery polymers having carbon-to-carbon double bond unsaturation along the polymer chain. The result is a polymeric material having increased resistance to deterioration caused by prolonged exposure to oxidative aging.

Representative of the variety of oxidizable, sulfur-curable rubbery polymers capable of reacting with the compounds of this invention are polymers of conjugated diolefins which include both natural rubber and the various synthetic rubbers such as polybutadiene and polyisoprene, also butyl rubber, which is a polymerization product of a major proportion of a monoolefin and a minor proportion of a multiolefin such as butadiene or isoprene are suitable. The rubbery copolymers of butadiene and acrylonitrile or butadiene and isoprene, butadiene and styrene and the like are also usable. The terpolymers formed by polymerizing ethylene, propylene, and a diene monomer known as EPDM can also be used.

The reaction between the 1,3-dipolar compounds of this invention and the oxidizable, sulfur-curable rubbery polymers described above takes place through a 1,3-dipolar cyclo-addition mechanism. By this mechanism the 1,3-dipolar compounds add across the carbon-to-carbon double bonds of the rubbery polymers to form five-membered heterocyclic rings along the polymer chain. The result is a polymer with built-in antioxidant characteristics which cannot be later removed by subsequent processing of the polymer.

The invention is further illustrated by reference to the following examples which are intended to be representative rather than restrictive.

EXAMPLE I

To a clean dry 250 ml. round bottom 3-neck flask equipped with a magnetic stirrer, thermometer and addition funnel was added 6.69 g. (0.02 mole) of 3,5-di-t-butyl-4-hydroxybenzylpyridinium chloride in 100 ml. of ethanol and 2.36 g. (0.022 mole) of nitrosobenzene. The clear solution was cooled to 0°–5°C. and sodium hydroxide (2.45 g.; 0.06 mole) in 60 ml. of water was added dropwise in 40 minutes. The reaction mixture was stirred an additional 3 hours at ambient temperature and then diluted with 50 ml. water, filtered, the filtrate acidified with glacial acetic acid, filtered, and the collected product dried to yield 5.07 g. (79.2% yield) of 1-(3,5-di-t-butyl-4-hydroxyphenyl)-N-phenylnitrone, MP–137°–140°C. The theoretical amount of carbon, hydrogen and nitrogen in the nitrone compound was calculated to be 77.49%, 8.37% and 4.30% respectively. An analysis of the compound for carbon, hydrogen and nitrogen found it to actually be 77.54%, 8.46% and 4.22% respectively.

While certain representative embodiments and details have been shown for the purpose of illustrating the invention, it will be apparent to those skilled in this art that various changes and modifications may be made therein without departing from the spirit or scope of the invention.

I claim:

1. The composition of matter selected from the group consisting of 1-(3,5-di-t-butyl-4-hydroxyphenyl)-N-naphthyl nitrone, 1-(3,5-di-t-butyl-4-hydroxyphenyl)-N-phenyl nitrone, 1-(3,5-di-t-butyl-4-hydroxyphenyl)-N-cyclohexyl nitrone, 1-(3,5-di-t-butyl-4-hydroxyphenyl)-N-(3-ethylphenyl)-nitrone, and 1-(3,5-di-t-butyl-4-hydroxyphenyl)-N-tolyl nitrone.

* * * * *